United States Patent
Smith et al.

(10) Patent No.: US 8,128,833 B1
(45) Date of Patent: Mar. 6, 2012

(54) NON-AQUEOUS ELECTROLYTE

(75) Inventors: W. Novis Smith, Philadelphia, PA (US);
Joel R. McCloskey, Philadelphia, PA (US)

(73) Assignee: Lithdyne International, Anaheim, CA (US)

( * ) Notice: Subject to any disclaimer, the term of this patent is extended or adjusted under 35 U.S.C. 154(b) by 494 days.

(21) Appl. No.: 11/455,447

(22) Filed: Jun. 19, 2006

(51) Int. Cl.
*H01G 9/035* (2006.01)

(52) U.S. Cl. .................. 252/62.2; 361/503; 361/504

(58) Field of Classification Search .............. 252/62.2; 429/324, 339, 342, 326; 361/503, 504
See application file for complete search history.

(56) References Cited

U.S. PATENT DOCUMENTS

| | | | | |
|---|---|---|---|---|
| 5,965,054 | A | * | 10/1999 | McEwen et al. ............. 252/62.2 |
| 6,728,096 | B1 | * | 4/2004 | Smith et al. .................. 361/523 |
| 2005/0127319 | A1 | * | 6/2005 | Fujioka et al. ............... 252/62.2 |

FOREIGN PATENT DOCUMENTS

WO   WO 2005/045861   *   5/2005

* cited by examiner

*Primary Examiner* — Carol M Koslow
(74) *Attorney, Agent, or Firm* — John Lezdey

(57) ABSTRACT

The present invention provides electrolytes for use in electronic devices which contain imidazolium salts in combination with high boiling aprotic solvents having lower flammability and lower toxicity than acetonitrile electrolytes.

10 Claims, 4 Drawing Sheets

0% BASELINE: 3.2 MOLAR DMI-BF4 IN 60-40 EC-GBL, 27.8 mS

0% BASELINE: 3.2 MOLAR DMI-BF4 IN 60-40 EC-GBL, 27.8 mS

NON-AQUEOUS ELECTROLYTE

FIELD OF THE INVENTION

The present invention relates to electrolytes which are useful for various electrochemical elements. More particularly, there is provided imidazolium salts which are useful at low temperatures, especially for use in electronic devices such as super capacitors and double layer capacitors (DLCs) in combination with high boiling aprotic solvents or non-nitrile solvents.

BACKGROUND OF THE INVENTION

The basic components of electrical capacitors include conductive electrodes connected to an electric power supply and a dielectric material separating the electrodes. Electrolytic capacitors and electrochemical double layer capacitors also have an electrolyte. In an electrolytic capacitor, the electrodes are provided by an oxide or carbon layer formed on metal foil and separated by a porous non conducting membrane such as paper, porous propylene, etc. The liquid electrolyte provides electrical contact to the opposite electrode through the separator. The inherently high resistance of electrolytic capacitors is generally mitigated by rolling a large sheet of the electrode material into a roll to give high surface area. In an electrochemical double layer capacitor, the dielectric is provided by the electrolyte. In this type of capacitor, the resistance of the electrolyte is a significant factor in the total device resistance. In capacitors that use electrolytes, the temperature has a major influence on the electrolyte in the performance of the capacitor since the conductivity of the electrolyte decreases with temperature.

Electrochemical double layer capacitors, including super capacitors, typically comprise electrodes, electrical contacts to a power supply, separators for electrodes and/or cells, an electrolyte and environmental seals. As mentioned above, a key component of electrolytic and electrochemical double layer capacitors is the electrolyte, which typically comprises a combination of a conductive salt and a solvent. Desirable electrolytes are typically liquid with low viscosity, low density, and high conductivity over a range of ambient temperature conditions. They should also be commercially inexpensive, chemically and electrochemically stable, and compatible with carbon. Aqueous electrolyte systems have been used extensively and provide voltage below 1.8v. However, certain organic aprotic liquid systems are less prone to form gas and can be more effective in providing higher energy densities over a wider usable range of temperature and potential. In addition, these organic electrolytes permit higher voltage and therefore results in higher capacity in the capacitors. The current non-aqueous aprotic solvent used for ultra capacitor electrolytes is acetonitrile which is toxic, highly flammable and has a voltage limit of 2.8v. For example, ultra capacitors in Japan are not permitted to use acetonitrile for the electrolyte. A need exists for improved electrolyte systems that provide optimum capacitance for capacitors to achieve high power density, a wide temperature range, and a long lifetime without memory effects.

The key requirements for the electrolyte in both non-aqueous batteries and capacitors are high voltage stability, low temperature performance and electrochemical stability.

U.S. Pat. No. 5,418,682 to Warren et al, which is herein incorporated by reference discloses a method of preparing tetraalkyl ammonium tetrafluoroborate salts for use as electrolytes with dinitrile mixtures as solvents.

U.S. Pat. No. 5,965,054 to McEwen et al, which is herein incorporated by reference discloses non-aqueous electrolytes for electrical storage devices utilizing salts consisting of alkyl substituted, cyclic delocalized aromatic cations and their perfluoro derivatives with alkyl carbonate solvents.

U.S. Pat. Nos. 6,535,373 and 6,902,684 to Smith et al, which are herein incorporated by reference, disclose similar electrolytes which utilize nitrile solvents.

SUMMARY OF THE INVENTION

The invention provides for improved electrolyte formulations for electronic devices which achieve higher conductivity, lower flammability and lower toxicity and higher voltage. Accordingly there is provided electrolytes comprising a mixture of low viscosity aprotic solvents which comprises not more than 3% by weight of acetonitrile and a) a cation which is an imidazolium compound of the formula:

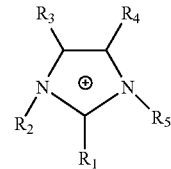

wherein $R_1$, $R_2$, $R_3$, $R_4$ and $R_5$ are the same or different and are selected from the group consisting of hydrogen, an alkyl of 1-4 carbon atoms, and fluoroalkyl, and b) an anion selected from the group consisting of triflate, tetrafluoroborate, hexafluoroarsenate, hexafluorophosphate and fluorohydrogen fluoride $[F(HF)_x^-]$ wherein ($x=1$ to 3) in a concentration more than 1.5 M in a solvent comprising a member selected from the group consisting of propylene carbonate (PC), dimethylacetamide, ethylene carbonate (EC) dimethylformamide, and gamma butyrolactone (GBL).

Advantageously, 1,3-dimethylimidazolium tetrafluoroborate (DMI-BF$_4$) and/or 1-ethyl-3 methyl imidazolium tetrafluoroborate (EMI-BF$_4$) in gamma butyrolacetone and propylene or ethylene carbonate is the electrolyte.

It is a general object of the invention to provide a capacitor with increased conductivity utilizing an electrolyte which is non-flammable and non-toxic.

It is another object of the invention to provide an electrolyte having low temperature performance down to −40° C.

It is yet another object of the invention to prove an electrolyte for electrochemical devices which is free of acetonitrile.

It is a further object of the invention to improve the performance of the AN ultracapacitor electrolytes to a voltage range up to about 4.0 volts without the use of acetonitrile.

It is still another object of the invention to provide additives which may further improve the conductivity of the electrolytes of the invention.

DESCRIPTION OF THE PREFERRED EMBODIMENTS

According to the invention there is provided electrolytes for use in electrochemical devices such as the AN ultracapacitor with little or no acetonitrile and which have a voltage range of at least 3.0 volts. More particularly, there is provided an electrolyte for electronic devices comprising at least one conductive salt consisting of:
  a) a cation which is an imidazolium compound of the formula:

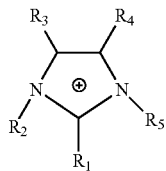

wherein $R_1$, $R_2$, $R_3$, $R_4$ and $R_5$ are the same or different and are selected from the group consisting of hydrogen, an alkyl of 1-4 carbon atoms and fluoroalkyl, and
  b) an anion selected from the group consisting of triflate, tetrafluoroborate, hexafluoroborate and fluorohydrogen fluoride [F(HF)$_x^-$] wherein x=1 to 3, and
  c) a solvent comprising a member of the group consisting of ethylene carbonate, propylene carbonate, dimethyl acetamide, dimethyl formanide and gamma butyrolactone,
said salt being in a concentration of at least 1.5 M.

The electrolytes can contain about 1 to 15%, preferably 1 to 5% by weight of methylene chloride, methyl acetate, and methylformate as an additive. They may also contain tetraethyl ammonium tetrafluoroborate (TEABF$_4$), methyltriethylammonium tetrafluoroborate (MTEA-BF$_4$), dimethyl diethylammonium tetrafluoroborate (DMDEA-BF$_4$) and ethyltrimethylammonium tetrafluoroborate (ETMA-BF$_4$). In certain cases up to 3% by weight of acetonitrile can be used and still have low flammability and toxicity although voltage is reduced.

A preferred solvent comprises the combination of ethylene carbonate (EC) and gamma butyrolactone (GBL) wherein ethylene carbonate comprises 30 to 70% by weight, preferably 40 to 60% by weight.

The salt concentration is at least 1.5 M, preferably 1.5 to 5.2 M range is 2.8-4.2 M.

Figure 1:
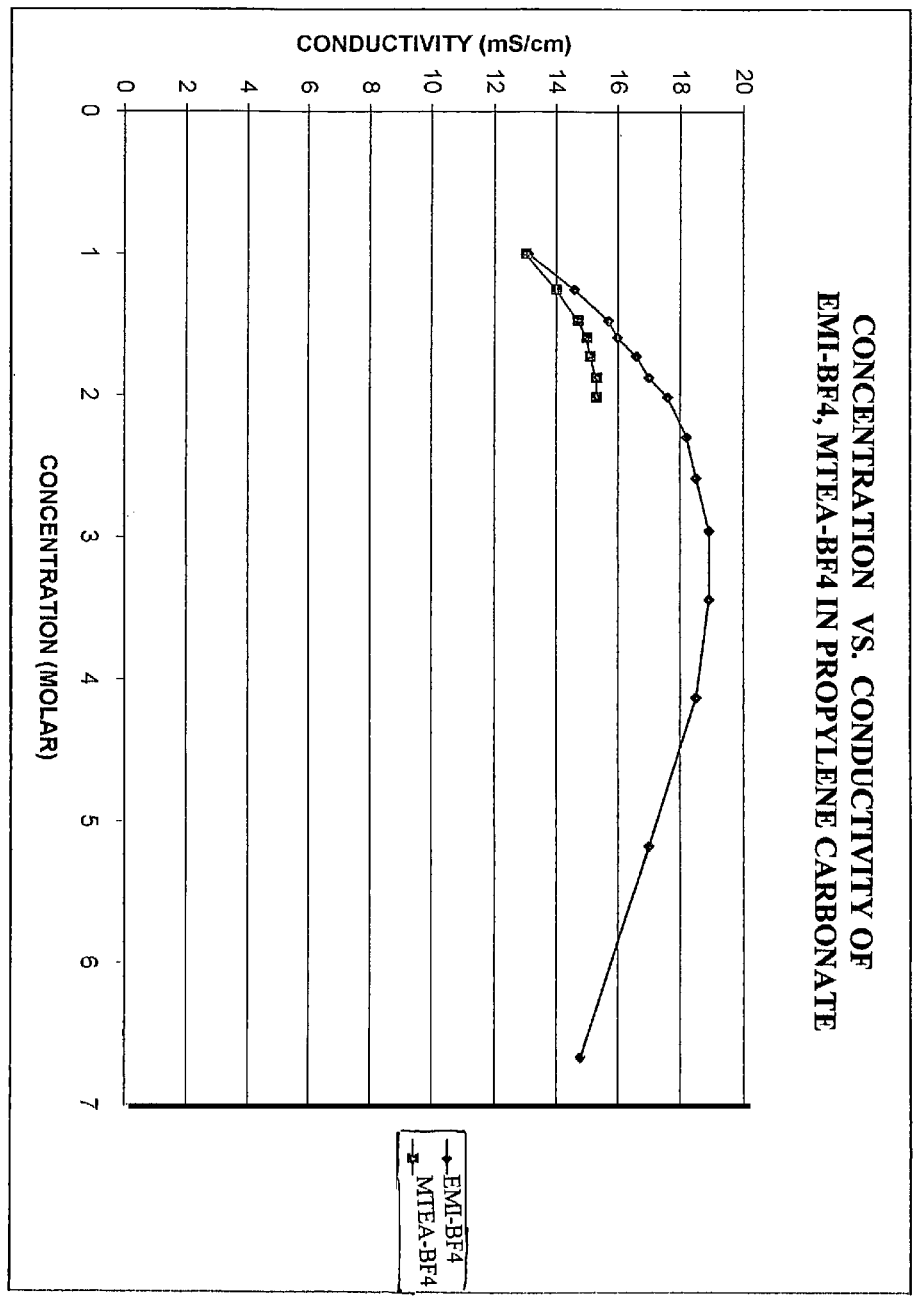
FIG. 1 is a graph showing the concentration vs. conductivity of each of EMI-BF$_4$ and MTEA-BF$_4$ (methyltriethyl ammonium tetrafluoroborate) in propylene carbonate only.
Figure 2:
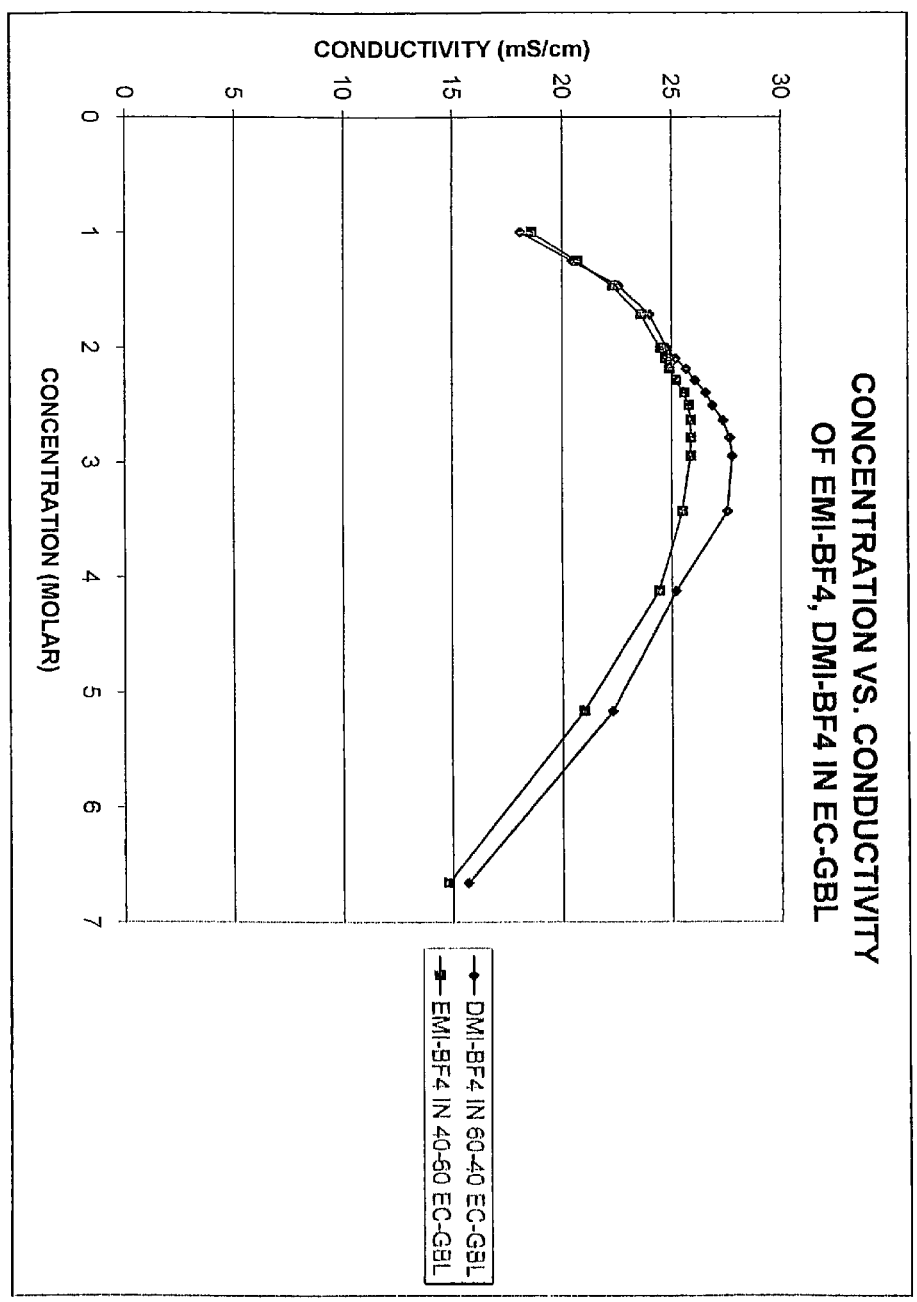
FIG. 2 is a graph showing the concentration vs. conductivity of EMI-BF$_4$ and of DMI-BF$_4$ in a solvent consisting of ethylene carbonate and gamma butyrolactone.
Figure 3:
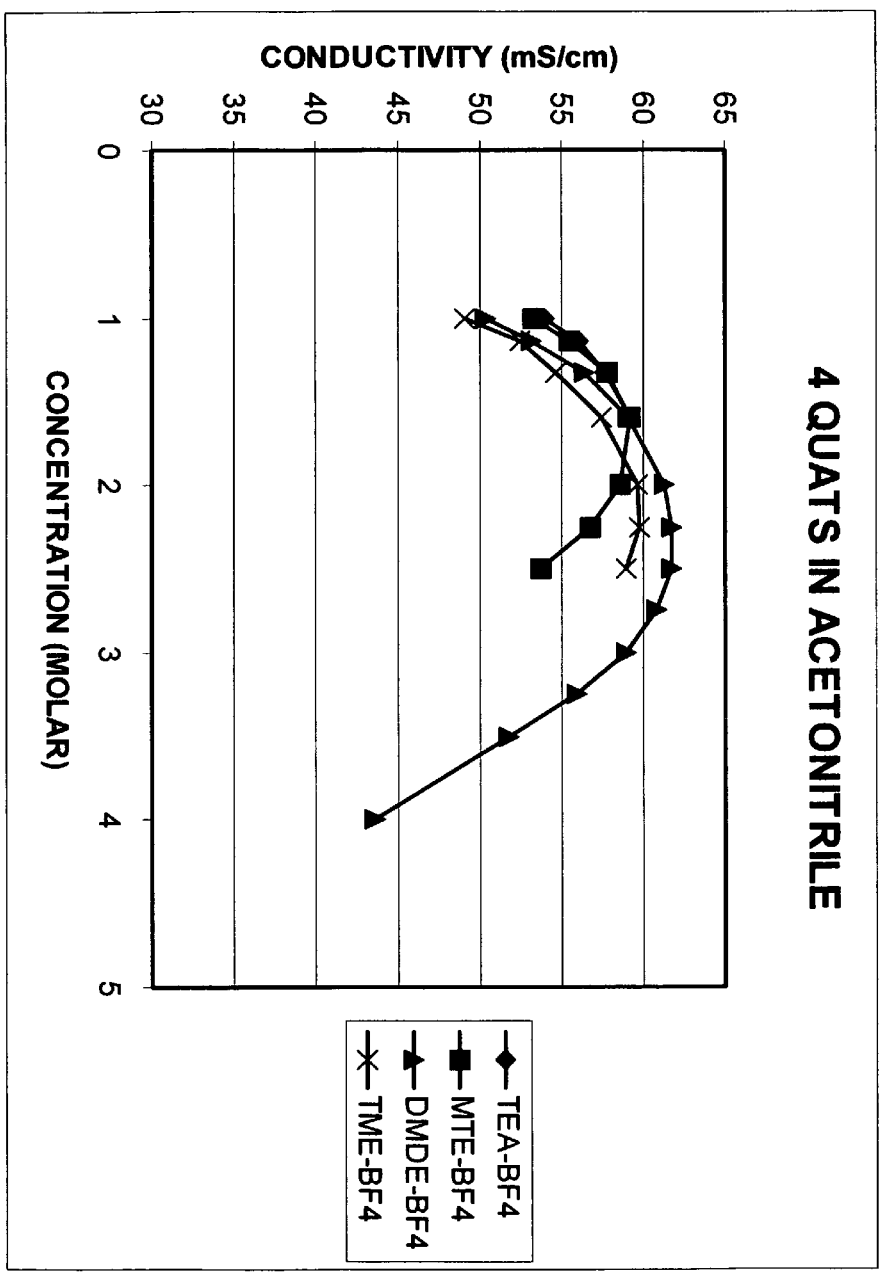
FIG. 3 is a graph showing the concentration vs. conductivity of four different tetraalkyl ammonium tetrafluoroborate salts each in a solvent consisting of ethylene carbonate and gamma butyrolactone.

It has been found that optimum formulation for these non-acetonitrile aprotic high boiling electrolytes is 2.5-2.8 M of 1-ethyl-3-methyl imidazolium tetrafluoroborate (EMIBF$_4$), in 40% EC/60& GBh with the maximum conductivity of 26.8 mS/cm; and that the optimum formulation is 2.5-3.2 M in 60% EC/40% GBL by weight for 1,3-dimethylimidazolium tetrafluoroborate (DMIBF$_4$) electrolytes with the maximum conductivity of 27.8 mS/cm, as seen in FIG. 2. This maximum conductivity is limited by the viscosity of these electrolytes. This is a 47% improvement in conductivity over the current non-acetonitrile aprotic electrolytes for ultra capacitors as seen in FIG. 1, and nearly 60% of the conductivity for current acetonitrile based ultra capacitor electrolytes. These improvements are seen more significant for these electrolytes because the ionic salt content is more than twice as much as the current electrolytes which results in even better efficiency in charge/discharge capacitance than implied from the conductivity values alone.

Figure 4:
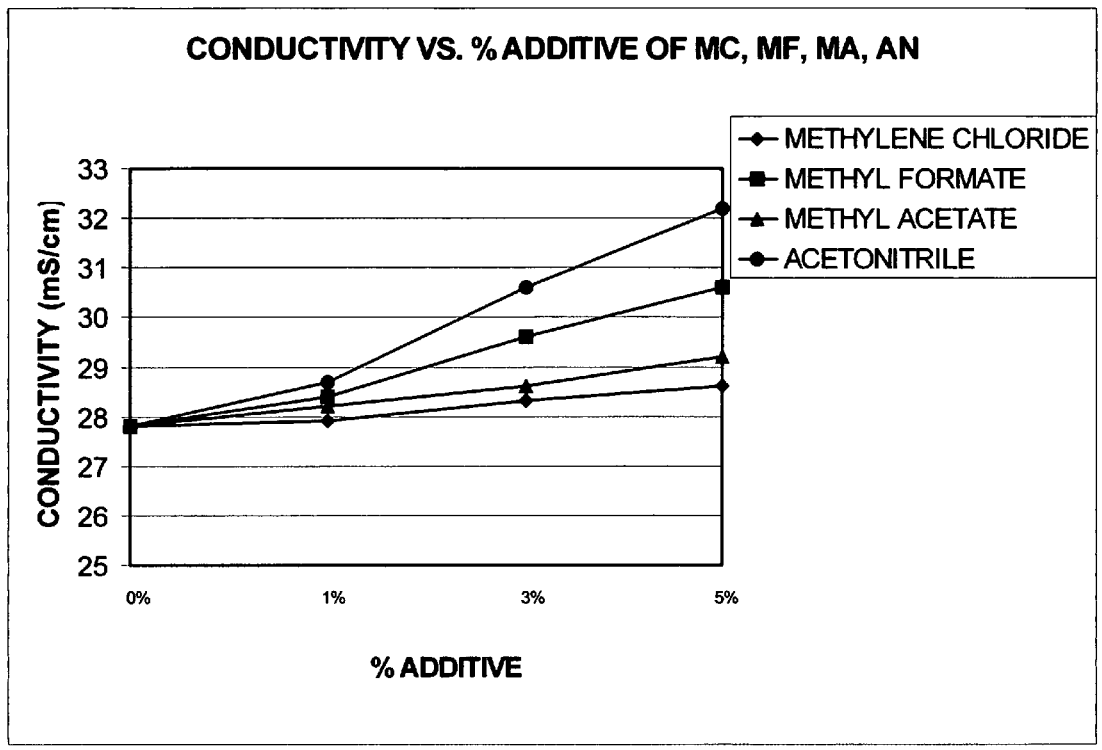
FIG. 4 is a graph showing the concentration vs. conductivity of addition of an additive to an electrolyte comprising DMI-BF$_4$ in ethylene carbonate and gamma butyrolactone.

When a limited amount of a low viscosity compatible aprotic solvent is added as an additive to these electrolytes the viscosity is reduced and the conductivity is again increased significantly with these reduced viscosity additives. The addition of 3% by weight of methyl acetate increases the conductivity of the optimum 1,3-dimethylimidazolium tetrafluoroborate (DMIBF$_4$) electrolyte from 27.8 to 31 mS/cm. As seen in FIG. 4, the addition of 3% acetonitrile results in an increase to 33 mS/cm. Methyl formate and methylene chloride are also effective, but less so. Dimethyl carbonate actually reduced the conductivity at the 1% level. These reduced viscosity additives also work with the optimum 1-ethyl-3-methyl imidazolium tetrafluoroborate (EMIBF$_4$) electrolyte. These are unique low viscosity additives for this system and therefore 1-5% by weight of these additives (methyl acetate, methylene chloride, methyl formate, and acetonitrile) result in the additional increase in conductivity as seen in FIG. 4, and about ⅔ of current acetonitrile based electrolytes for ultra capacitors. In addition to these conductivity achievements, these new electrolytes have significantly reduced flammability and toxicity; improved low temperature performance, and high conductive salt content for enhanced performance.

It was found that ethylene carbonate (EC) was essential to achieve significant improvement in conductivity over the current non-acetonitrile aprotic electrolytes (18-19 mS/cm) based on propylene carbonate (PC). The problem with EC is that it has a melting point about 36° C. and readily precipitates out of the solution on cooling to low temperatures. Thus PC based electrolytes which have satisfactory low temperature performance down to −20° C. cannot contain significant amounts of EC. It was found that a synergistic effect occurs with the combined use of EC and either DMIBF$_4$ and/or EMIBF$_4$ to about molar equivalent amounts which results in the formation of conductive liquid eutectic mixtures at room temperature although viscous. It was further found that the addition of gamma butyrolactone (GBL) in amounts up to 85% of the weight of the EC in the mixture maximizes the conductivity of these electrolyte formulations and also results in excellent low temperature performance down to −40° C. These mixtures also have the distinct advantage of not being flammable with the use of these high boiling solvents (bp>208° C.) and the high percentage of the liquid quaternary salts (>20% by weight). Other high boiling solvents can be used in place of the GBL or in combination.

EXAMPLE 1

Preparation of 1,3-Dimethylimidazolium tetrafluoroborate (DMIBF$_4$)

2100 g (25.6 moles) of 1-methyl imidazole were added to a 5-1 Hastalloy pressure container containing a large magnetic stirring bar and 1500 ml of acetonitrile. This was followed by the addition of 81 g of methyl chloride directly to the stirred mixture and then the container was sealed with a pressure gasket, heavy plate and clamps. This reactor was heated with stirring up to about 80° C. and charged with additional methyl chloride directly from a cylinder. The pressure was maintained at 25 to 30 psi and the temperature was maintained at 80-85° C. with cooling. When the reaction appeared to slow, the temperature was allowed to rise to 90° C. with some external heating and the pressure increased to 40 psi. When no further reaction was observed, the temperature was maintained for an additional hour and then the contents cooled and vented. (Elapsed reaction time was six hours.) The reactor was placed under vacuum and heated to distill over the acetonitrile. When the reactor reached 85° C. while under vacuum, the heat was cut off and the reactor cooled to room temperature. At this point the pale grayish white crystalline product (1,3-dimethylimidazolium chloride) was solid and the yield was essentially quantitative. Added 5042 g 48% fluoroboric acid was added directly to the reactor. The crystals slowly dissolved with a mild exotherm with the smell of HCl being formed. The reactor was closed, stirred and vacuum applied. The vapors were trapped into a trap at
−78° C. The reactor was heated to 100° C. and then cooled. The dark liquid was free of chloride. The liquid was neutralized with sodium bicarbonate until no further reaction occurred. The solution was filtered and then the oil recrystallized from methyl ethyl ketone and acetone (80:20) three times at −50° C. The product melting point was 19-20° C. The overall yield was 80%. The analysis for $BF_4$ anion using tetraphenylarsonium chloride precipitation was 48.97%. The FTIR showed the present of both the 1,3-dialkylimidazolium cation and the $BF_4$ anion.

EXAMPLE 2

A study was conducted to determine the conductivity of each of methyltriethyl ammonium tetrafluoroborate (MTEABF$_4$) and 1-ethyl-3-methylimidazolium tetrafluoroborate (EMIBF$_4$) in different concentrations. The results were as follows:

| Concentration vs. Conductivity EMI-BF$_4$, and MTEA-BF$_4$ in Propylene Carbonate | | |
|---|---|---|
| | Conductivity mS/cm | |
| Concentration (M) | EMI-BF$_4$ | MTEA-BF$_4$ |
| 6.65 | 14.8 | |
| 5.16 | 17 | |
| 4.12 | 18.5 | |
| 3.43 | 18.9 | |
| 2.95 | 18.9 | |
| 2.58 | 18.5 | |
| 2.29 | 18.2 | |
| 2.01 | 17.6 | 15.3 |
| 1.87 | 17 | 15.3 |
| 1.72 | 16.6 | 15.1 |
| 1.59 | 16 | 15 |
| 1.47 | 15.7 | 14.7 |
| 1.25 | 14.6 | 14 |
| 1 | 13.1 | 13 |

1-ethyl-3-methylimidazolium tetrafluoroborate (EMI-BF$_4$) had greater conductivity compared to methyltriethyl ammonium tetrafluoroborate (MTEA-BF$_4$) at lower concentrations and continued to improve at a high concentration in propylene carbonate as seen in FIG. 1. The conductivities of these salts in PC were not as high as in the EC/GBL mixed solvent in FIG. 2.

EXAMPLE 3

A study was conducted to determine the conductivity of DMI-BF$_4$ and EMI-BF$_4$ in mixed solvents. DMI-BF$_4$ was tested in a solvent consisting of 60% ethylene carbonate and gamma butyrolactone and EMI-BF$_4$ was in a solvent consisting of 40% ethylene carbonate and 60% gamma butyrolactone. The results were as follows:

| Conductivity mS/cm | | |
|---|---|---|
| Concentration (Molar) | DMI-BF$_4$ in 60% EC-40% GBL | EMI-BF$_4$ in 40% EC-60% GBL |
| 6.65 | 15.7 | 14.8 |
| 5.16 | 22.3 | 21.0 |
| 4.12 | 25.2 | 24.4 |
| 3.43 | 27.6 | 25.5 |
| 2.95 | 27.8 | 25.9 |
| 2.79 | 27.7 | 25.9 |
| 2.64 | 27.4 | 25.9 |
| 2.51 | 26.9 | 25.8 |
| 2.4 | 26.6 | 25.6 |
| 2.29 | 26.1 | 25.2 |
| 2.19 | 25.7 | 24.9 |
| 2.1 | 25.2 | 24.7 |
| 2.01 | 24.8 | 24.5 |
| 1.72 | 24.0 | 23.6 |
| 1.47 | 22.6 | 22.3 |
| 1.25 | 20.5 | 20.7 |
| 1 | 18.1 | 18.6 |

At low concentration DMI-BF$_4$ and EMI-BF$_4$ were substantially the same in conductivity but DMI-BF$_4$ increases in conductivity at a higher concentration. Both salts reach a peak at similar molar concentrations. The molecular weight of DMI-BF$_4$ is lower than EMI-BF$_4$. The results are shown in FIG. 2.

EXAMPLE 4

A study was conducted to determine the conductivity of different quaternary ammonium tetrafluoroborate salts in a mixed solvent of 60% ethylene carbonate and 40% gamma butyrolactone. The quaternary ammonium salts consisted of tetraethylammonium tetrafluoroborate (TEA-BF$_4$) methyl triethylammonium tetrafluoroborate (MTEA-BF$_4$), dimethyldiethylammonium tetrafluoroborate (DMDEA-BF$_4$) and ethyltrimethyl ammonium tetrafluoroborate (MTEA-BF$_4$).

| Conductivity (mS/cm) | | | | |
|---|---|---|---|---|
| Concentration M | TEA-BF$_4$ | MTEA-BF$_4$ | DMDEA-BF$_4$ | MTEA-BF$_4$ |
| 3 | | | 20.2 | |
| 2.75 | | | 21.4 | |
| 2.5 | | 20.4(Sat.) | 21.9 | 21.4(Sat.) |
| 2.25 | | 21.4 | 22.3 | 21.8 |
| 2 | | 21.4 | 22.3 | 21.5 |
| 1.6 | 17.8(Sat.) | 20.9 | 21.6 | 20.4 |
| 1.33 | 19.9 | 19.8 | 20.4 | 19.3 |
| 1.14 | 18.7 | 18.6 | 19.2 | 18.1 |
| 1 | 17.5 | 18.1 | 18.1 | 16.8 |

Higher concentrations of the tetraalkyl ammonium compounds continued to give a higher conductivity and then peaked. The combined use of EC and GBL and higher salt concentrations were needed to create a favorable conductivity.

What is claimed is:
1. An electrolyte for electronic devices comprising at least one conductive salt consisting of:

a) a cation which is an imidazolium compound of the formula:

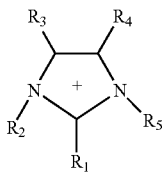

wherein $R_1$, $R_2$, $R_3$, $R_4$ and $R_5$ are the same or different and are selected from the group consisting of hydrogen, an alkyl of 1-4 carbon atoms and fluoroalkyl, and
b) an anion selected from the group consisting of triflate, tetrafluoroborate, hexafluoroborate and fluorohydrogen fluoride,
c) a solvent comprising at least one member of the group consisting of ethylene carbonate, propylene carbonate, dimethyl acetamide, dimethyl formamide and gamma butyrolactone, and
d) a compound selected from the group consisting of methylene chloride, methylacetate and methyl formate in the amount of about 1-15 wt %, said salt being in a concentration of at least 1.5 M.

2. The electrolyte of claim 1 wherein said salt is 1,3-dimethylimidazolium tetrafluoroborate.

3. The electrolyte of claim 2 wherein the solvent is ethylene carbonate and gamma butyrolactone.

4. The electrolyte of claim 3 wherein said solvent comprises 30 to 70% by weight of ethylene carbonate.

5. The electrolyte of claim 3 which includes about 3% by weight of a member selected from the group consisting of methyl acetate, methylene chloride, methyl formate and acetonitrile.

6. The electrolyte of claim 1 where the salt is selected from the group consisting of 1,3-dimethylimidazolium tetrafluoroborate and 1-ethyl-3-methylimidazolium tetrafluoroborate.

7. The electrolyte of claim 6 wherein the salt concentration is 1.5 to 4.5 M.

8. The electrolyte of claim 1 including about 3% by weight of acetonitrile.

9. In an electronic device containing a non-aqueous electrolyte, wherein the improvement comprises the electrolyte is the electrolyte of claim 1.

10. An electrolyte for electronic devices comprising at least one conductive salt consisting of:
a) a cation which is an imidazolium compound of the formula:

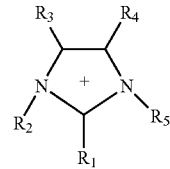

wherein $R_1$, $R_2$, $R_3$, $R_4$ and $R_5$ are the same or different and are selected from the group consisting of hydrogen, an alkyl of 1-4 carbon atoms and fluoroalkyl, and
b) an anion selected from the group consisting of triflate, tetrafluoroborate, hexafluoroborate and fluorohydrogen fluoride,
c) a solvent comprising at least one member of the group consisting of ethylene carbonate, propylene carbonate, dimethyl acetamide, dimethyl formamide and gamma butyrolactone, and
d) about 1 to 15% by weight of methyl triethylammonium tetrafluoroborate, dimethyldiethylammonium tetrafluoroborate, or trimethylethylammonium tetrafluoroborate, said salt being in a concentration of at least 1.5 M.

* * * * *